United States Patent
Haskell et al.

[11] Patent Number: 5,995,148
[45] Date of Patent: Nov. 30, 1999

[54] VIDEO CODER HAVING SCALAR DEPENDENT VARIABLE LENGTH CODER

[75] Inventors: Barin Geoffry Haskell, Tinton Falls, Monmouth County, N.J.; Atul Puri, Riverdale, Bronx County, N.Y.; Robert Louis Schmidt, Howell, Monmouth County, N.J.

[73] Assignee: AT&T Corp, New York, N.Y.

[21] Appl. No.: 08/899,095

[22] Filed: Jul. 24, 1997

Related U.S. Application Data

[60] Provisional application No. 60/038,018, Feb. 14, 1997.

[51] Int. Cl.$^6$ ..................................................... H04N 7/24
[52] U.S. Cl. ............................................................ 348/405
[58] Field of Search .................................... 348/384, 390, 348/405, 419; 382/232, 251; 341/65, 67, 200

[56] References Cited

U.S. PATENT DOCUMENTS

| | | | |
|---|---|---|---|
| 5,455,578 | 10/1995 | Bhandari | 341/67 |
| 5,559,557 | 9/1996 | Kato | 348/405 |
| 5,699,119 | 12/1997 | Chung | 348/405 |

FOREIGN PATENT DOCUMENTS

| | | | |
|---|---|---|---|
| 0595544 | 4/1994 | European Pat. Off. | H04N 7/13 |
| 2-237368 | 9/1990 | Japan | H04N 1/41 |

OTHER PUBLICATIONS

"Intra Prediction (T0/T10) and DC/Ac Prediction Results ; International Organisation for Standardisation Coding of Moving Pictures and Associated Audio Information" ISO/IEC JTC1/SC29/WG11 MPEG96/0939 Jul. 1996.

"Altered Sections of H.263 for Draft Test of H.263+"; ITU–Telecommunications Standardization SectorDocument: ITU–LBC–96–358R1 Study Group 15, Jul. 1996.

*Primary Examiner*—Bryan Tung

[57] ABSTRACT

Method and apparatus for generating variable length coded for video encoding. A plurality of memory tables contain variable length codes tailored to patterns of input video information that is likely to be input to the variable length encoder. The patterns are determined in large part by a value of a quantizer used in video encoding. A separate memory table containing separate variable length codes is established for each of a plurality of quantization parameter values. The quantization parameter is input to the encoder to enable one of the memory tables and the video information is input to the enabled table to generate the variable length code.

26 Claims, 2 Drawing Sheets

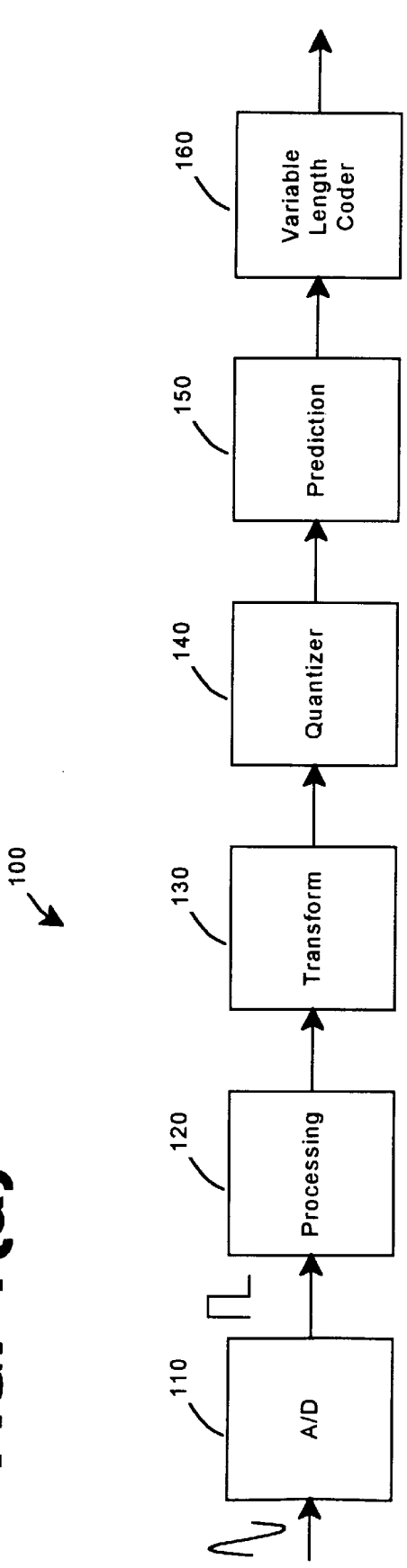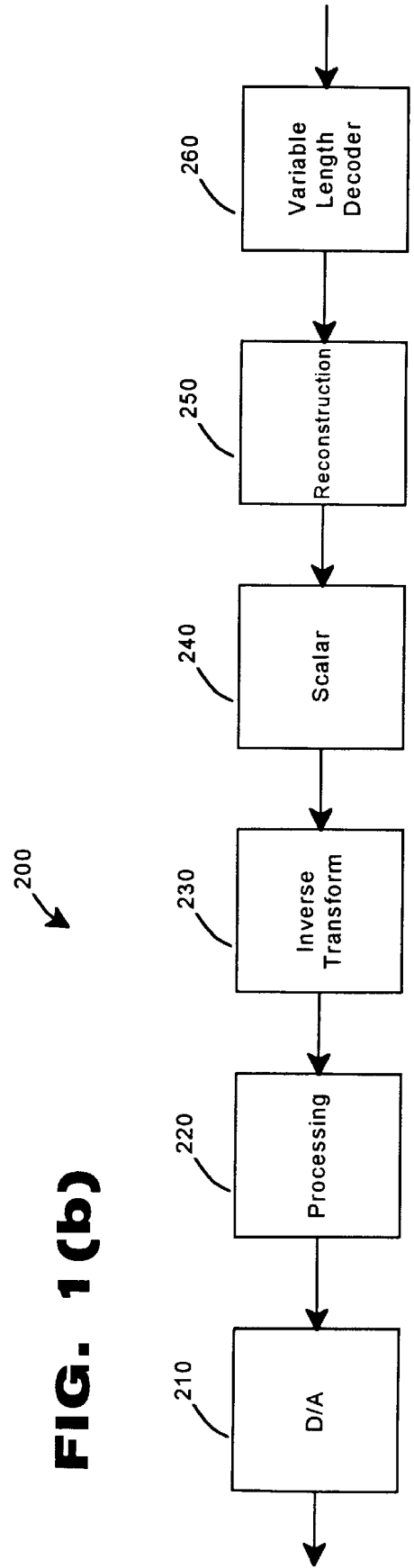
FIG. 1(a)
FIG. 1(b)

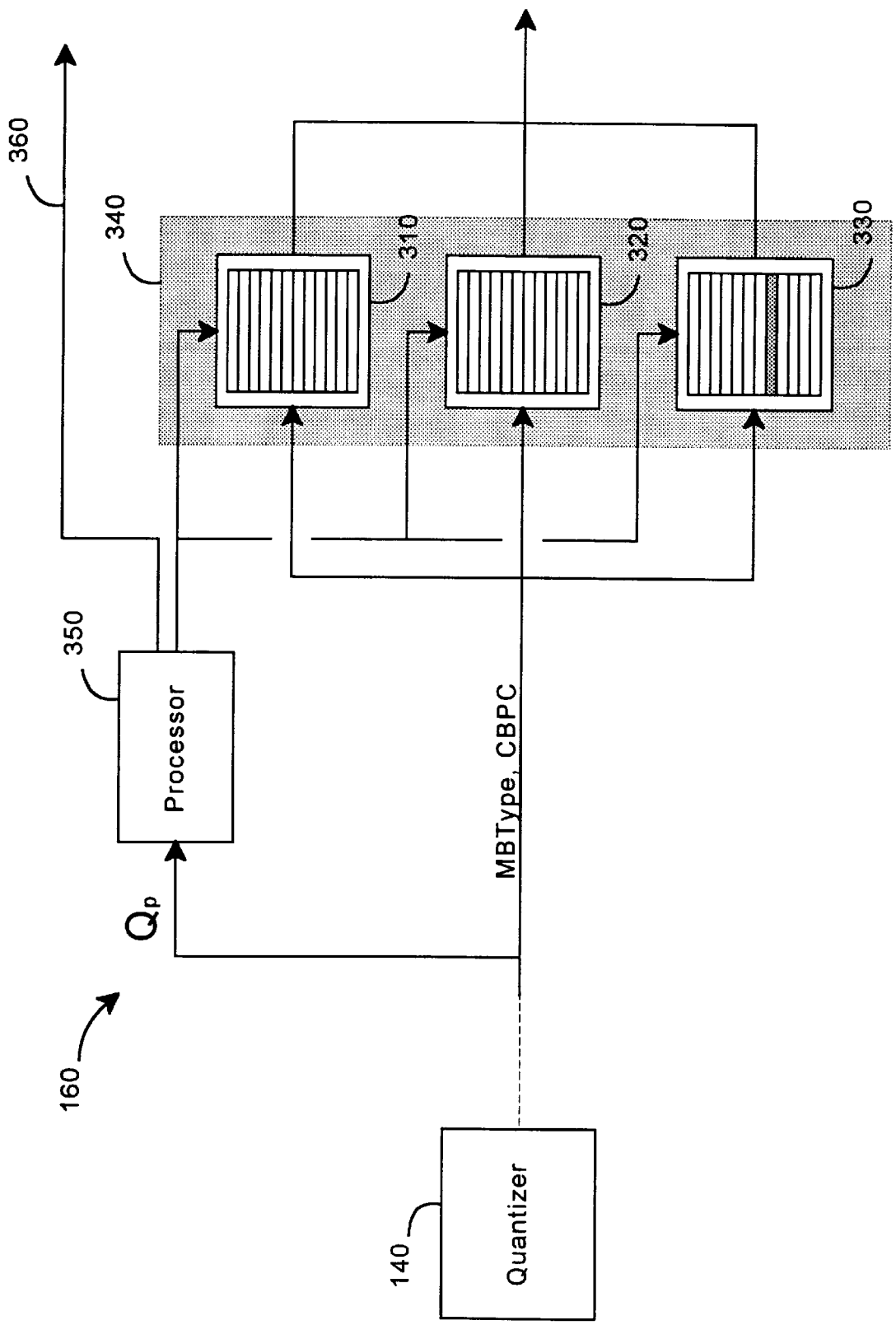

VIDEO CODER HAVING SCALAR DEPENDENT VARIABLE LENGTH CODER

RELATED APPLICATION

This is a continuation in part application that benefits from priority of provisional patent application Ser. No. 60/038,018, filed Feb. 14, 1997.

BACKGROUND OF THE INVENTION

The present invention relates to video coders and, specifically, to variable length coders utilized in the coding of video images.

Currently, several standards for video coding have been defined or are under consideration. The proposed standard for video coding of motion pictures, MPEG-4, provides for coding according to a discrete cosine transform, quantization, run length coding and additionally variable length coding (VLC). VLC tables are preferred due to their low complexity. They permit bit savings by allocating shorter codes to video signals that occur with high frequency and longer codes are allocated to video signals that occur with lower frequency. However, VLCs are narrowly tailored for specific applications; they do not adapt to dynamic conditions. For example, for intra coding in the verification model no. 6 of the proposed MPEG-4 coding standard, a first VLC table is used to code DC coefficients of luminance, a second VLC table codes AC coefficients of luminance, a third VLC table codes DC coefficients of chrominance and a fourth VLC table codes AC coefficients of chrominance. For inter coding, additional VLC tables may be required. However, the addition of VLC tables increases system complexity and requires additional signaling to identify when specific VLC tables are in use. Such overhead consumes bandwidth and contributes to coding inefficiencies.

Video coders now may advantageously employ variable quantizers. Quantizers divide down a video signal by a quantization parameter to reduce bandwidth occupied by the coded signal. A variable quantizer divides down by a variable quantization parameter but it changes the statistics of the video signal coded by the VLC tables. Thus, changes in the quantization parameter affects the coding efficiencies of the VLC tables. Coding savings obtained at the quantizer may result in costs at the VLC table.

Accordingly, there is a need in the art for a coding scheme that integrates a variable quantizer with a variable length encoder. Further, there is a need in the art for such a coding scheme that switches among VLC tables without additional overhead signaling.

SUMMARY OF THE INVENTION

The present invention alleviates the disadvantages in the art by adopting a coding scheme based on the value of the quantization parameter used. The variable length encoder applies a VLC table that is determined by the value of variable quantization parameter, $Q_p$. Because the decoder knows the value of $Q_p$, no overhead signal need be transmitted to the decoder to synchronize the value of $Q_p$ between the encoder and the decoder.

BRIEF DESCRIPTION OF THE DRAWINGS

FIG. 1(a) illustrates an encoder in accordance with an embodiment of the present invention.

FIG. 1(b) illustrates a decoder in accordance with an embodiment of the present invention.

FIG. 2 is a diagram of portions of the quantizer and the variable length coder of FIG. 1(a).

DETAILED DESCRIPTION

The present invention integrates a quantizer characterized by a variable quantization parameter ($Q_p$) with a variable length encoder. The variable length coder stores VLC tables in memory. The VLC tables are selected based on the value of the variable quantization parameter applied at the quantizer. The quantization parameter is updated traditionally on a macro block by macro block basis. Accordingly, the variable length encoder may switch automatically among VLC tables at each macro block depending on whether the quantization parameter has been updated.

Updates to the quantization parameter are reported in the bitstream output from the encoder. When a macro block is decoded, the decoder calculates a quantization parameter for the macro block based on the quantizer update information and the quantization parameter of the previous macro block. Based on the calculated quantization parameter, the decoder switches among a plurality of tables to decode the variable length tables. By switching among VLC tables according to the value of the quantization parameter, three or four VLC tables may be used generically for all signal types.

The new VLC tables are designed to be interchangeable not only between luminance and chrominance but also in coding of inter and intra coefficients. The statistics of such video information correlate strongly with the value of the quantizer parameter.

In a first preferred embodiment, the number and value of breakpoints between VLC tables are predetermined at both the encoder and decoder. The breakpoints are static; they do not change. No initialization is required to synchronize breakpoints used by a decoder with breakpoints used at the encoder.

In a second preferred embodiment, breakpoints between VLC tables are defined at the encoder. The encoder includes an table initialization signal in a bitstream output from the encoder that identifies breakpoints. Because the breakpoints generally occur for intermediate values of the quantization parameter, the length of the breakpoint initialization signal may be shortened by coding only an offset from a base breakpoint.

For example, in an MPEG-4 embodiment, $Q_p$ takes a value between 1–31. The breakpoint initialization signal may be a 3 bit signal identifying an offset from $Q_p=8$. Depending upon the breakpoint initialization signal, a breakpoint may be established between $Q_p=9$ and $Q_p=16$. Alternatively, the encoder may include a 4 bit signal identifying an offset from $Q_p=5$. Depending upon the breakpoint initialization signal, a breakpoint may be established between $Q_p=6$ and $Q_p=21$.

Selection of the quantization parameter value $Q_p$ is made based upon the bandwidth or bit rate available to the channel, the resolution of the encoded image and other considerations known to those of skill in the art. Typically, at lower values of $Q_p$, a higher bandwidth is available to the channel, more detailed image information is encoded and, consequently, higher image quality is obtained. In a preferred embodiment, the VLC table is optimized for video information at very low $Q_p$ values ($Q_p<6$ in the MPEG-4 scheme).

DC luminance and DC chrominance information carries the most perceptually significant video information in the block. Accordingly, in a preferred embodiment, the VLC tables are optimized for DC luminance and chrominance information, particularly at very low values of the quantization parameter ($Q_p<6$ in the MPEG-4 scheme).

Appreciable differences in image quality are rarely obtained among quantizer values in the middle to high ranges ($31>Q_p>18$ in the MPEG-4 scheme). Accordingly, in another preferred embodiment, separate VLC tables are allocated to quantizer parameter values for very low $Q_p$ values, for low $Q_p$ values and for high $Q_p$ values. For instance, in the MPEG-4 scheme, separate VLC tables are provided for $Q_p=1$ to 6, $Q_p=7$ to 17 and $Q_p=18$ to 31.

At middle to high quantization parameter values, statistics of inter coded coefficients often possess similarities to intra coded coefficients. Accordingly, in a further preferred embodiment, the VLC tables at the middle to high quantization parameter values may be optimized for use with inter coded coefficients.

The present invention is not limited to coding of video information. In addition, the advantages of the present invention also may encode overhead information that indicates which of the blocks in the macro block contain coded information. For example, verification model no. 6 of the proposed MPEG-4 standard provides for encoding of an MBtype field to indicate the type of coding (intra, intra+quantizer update, inter, inter+quantizer update, etc.). Further, because some blocks may be eliminated entirely by quantization, the standard provides for encoding of a CBPC field to indicate which of the chrominance blocks contain coded information and a CBPY field to indicate which of the luminance blocks contain encoded information. Because the frequency at which blocks are eliminated depends on the value of the quantization parameter, the techniques of the present invention may be used to code MBtype, CBPC and CBPY.

In one preferred embodiment, three VLC tables have been developed for encoding MBtype and CBPC in the proposed MPEG-4 coding standard. The quantization parameter based switching is applied to both a macro block type and coded block pattern field for coding of chrominance information as follows:

TABLE 1

VLC's for CBPC with Quantizer, $Q_p$ in range

| MBtype | CBPC | 1 through 6 | 7 through 14 | 15 through 31 |
|---|---|---|---|---|
| 3 | 00 | 01 | 1 | 1 |
| 3 | 01 | 0011 | 0011 | 001 |
| 3 | 10 | 0010 | 0010 | 010 |
| 3 | 11 | 1 | 01 | 011 |
| 4 | 00 | 0001 | 0001 | 0001 |
| 4 | 01 | 0000011 | 0000011 | 000001 |
| 4 | 10 | 0000010 | 0000010 | 000010 |
| 4 | 11 | 001 | 0001 | 000011 |

According to the MPEG-4 standard, MBtype=3 when the macro block contains intra coded information and no quantizer update is included in the bitstream; MBtype=4 when the macro block contains intra coded information and a quantizer update is included in the bitstream. CPBC indicates whether the first or second chrominance blocks in the macro block contains video information. A '1' in either bit position indicates that video information for a corresponding chrominance block is encoded.

At higher values of $Q_p$, one expects that it is more likely that the two chrominance blocks are eliminated completely. Thus, for CPBC=00, the VLC code is shortest when $Q_p$ falls between 15 and 31. At low $Q_p$'s, one expects that it is more likely that the bitstream will contain encoded signals for both chrominance blocks. Thus, the VLC is shortest at CBPC=11 when $Q_p$ is between 1 and 6.

In the example of Table 1, three VLC tables are defined for image data having breakpoints at $Q_p=7$ and $Q_p=15$. In this example, when the scalar falls between 1 and 6, the first VLC table is used. When the scalar falls between 7 and 14, the second VLC table is used. The third VLC table is used when the scalar exceeds 15.

Similarly, in the preferred embodiment, three VLC tables have been obtained for CBPY based on values of the quantization parameter.

TABLE 2

VLC'S for CBPY with Quantizer, $Q_p$, in range

| CBPY | 1 through 14 | 15 through 22 | 23 through 31 |
|---|---|---|---|
| 00 00 | 001 | 01 | 01 |
| 00 01 | 00001 | 00001 | 00001 |
| 00 10 | 000001 | 11000 | 11010 |
| 00 11 | 00010 | 0001 | 0001 |
| 01 00 | 011100 | 11001 | 11011 |
| 01 01 | 00011 | 11010 | 1000 |
| 01 10 | 011101 | 000001 | 000001 |
| 01 11 | 01000 | 11011 | 1001 |
| 10 00 | 011110 | 111110 | 1010 |
| 10 01 | 011111 | 111111 | 111110 |
| 10 10 | 01001 | 11100 | 111111 |
| 10 11 | 01010 | 11101 | 11110 |
| 11 00 | 01011 | 0010 | 1011 |
| 11 01 | 01100 | 0011 | 1100 |
| 11 10 | 01101 | 11110 | 1110 |
| 11 11 | 1 | 10 | 001 |

At low values of $Q_p$, where one would expect the fewest coefficients divided down to zero, the shortest code indicates that all four luminance blocks in the macro block contain data (CBPY=1111).

FIG. 1 shows an encoder 100 constructed in accordance with a first embodiment of the present invention. An analog image signal is presented to the encoder 100. The image signal is sampled and converted to a digital signal by an analog to digital ("A/D") converter 110 using techniques known in the art. The A/D converter 110 generates a digital image signal for a plurality of pixels of the image. Alternatively, the image signal may be presented to the encoder as a digital image signal; in this case, the A/D converter 110 is omitted.

The digital image signal is input to a processing circuit 120. The processing circuit 120 may perform a host of functions. Typically, the processing circuit 120 filters the image data and breaks the image data into a luminance signal component and two chrominance signal components. Additionally, the processing circuit 120 groups image data into blocks of data. Where the digital input signal represents information for a plurality of pixels in a scanning direction, the digital output of the processing circuit 120 represents blocks of pixels, for example, data may be blocked into 8 pixel by 8 pixel arrays of image data. The processing circuit 120 outputs image data on a macro block basis. A macro block typically consists of four blocks of luminance data and two blocks of chrominance data. The processing circuit 120 may also perform additional functions, such as filtering, to suit individual design criteria.

The output of the processing circuit 120 is input to a transform circuit 130. The transform circuit 130 performs a transformation of the image data, such as discrete cosine transform ("DCT") coding or sub-band coding, from the pixel domain to a domain of coefficients. A block of 64 pixels is transformed to a block of 64 coefficients. Coefficients output by DCT coding generally include a single DC coefficient and 63 AC coefficients, some of which are non-zero. Similarly, coefficients output by sub-band coding represent image characteristics at a variety of frequencies; typically, many coefficients from sub-band coding are very small. The transform circuit 130 outputs blocks of coefficients.

A quantizer 140 scales the signals generated by the transform circuit 130 according to a constant or variable scalar value ($Q_p$). The quantizer 140 reduces bandwidth of the image signal by reducing a number of quantization levels available for encoding the signal. The quantization process is lossy. Many small coefficients input to the quantizer 140 are divided down and truncated to zero. The scaled signal is output from the quantizer 140.

The prediction circuit 150 performs gradient prediction analysis to predict scaled DC coefficients of each block. The prediction circuit 150 may pass scaled AC coefficients or, alternatively, may predict AC coefficients of the block. In a preferred mode of operation, the prediction circuit 150 selects between modes of predicting or passing AC coefficients; in this case, the prediction circuit 150 generates an AC prediction flag to identify a mode of operation. The prediction circuit 150 outputs a DC residual signal, AC signals (representing either AC coefficients or AC residuals) and, optionally, an AC prediction flag.

A variable length coder 160 encodes the output of the prediction circuit 150. The variable length coder 160 typically is a Huffman encoder that performs run length coding on scaled video signals but is triggered by the values of $Q_p$. A bitstream output from the variable length coder 160 may be transmitted, stored, or put to other uses as are known in the art.

In the encoder 100, the prediction circuit 150 and the quantizer 140 perform functions which are mutually transparent. Accordingly, their order of operation is largely immaterial. Although FIG. 1 illustrates output of the quantizer 140 as an input to the prediction circuit 150, the circuits may be reversed in order. The output of the prediction circuit 150 may be input to the quantizer 140.

A decoder 200 performs operations that undo the encoding operation described above. A variable length decoder 260 analyzes the bitstream using a complementary process to recover a scaled signal. If a Huffman encoder were used by the encoder 160, a Huffman decoder 260 is used.

A reconstruction circuit 250 performs the identical gradient analysis performed in the prediction circuit 150. The DC residual signal is identified and added to a predicted coefficient to obtain a DC coefficient. Optionally, the reconstruction circuit 250 may identify the AC prediction flag and, on the status of that flag, interprets the AC information as either AC coefficient information or AC residual information. In the event that AC residual information is present, the reconstruction circuit 250 adds the residual signals to corresponding predicted signals to obtain AC coefficients. The reconstruction circuit 250 outputs coefficient signals.

A scalar circuit 240 multiplies the recovered signal by the same scalar used as a basis for division in the quantizer 140. Of course, those coefficients divided down to zero are not recovered.

An inverse transformation circuit 230 performs the inverse transformation applied by the transform circuit 130 of encoder 100. If a DCT transformation were performed, an inverse DCT transformation is applied. So, too, with sub-band coding. The inverse transformation circuit 230 transforms the coefficient information back to the pixel domain.

A processing circuit 220 combines luminance and chrominance signals and may perform such optional features as are desired in particular application. The processing circuit 220 outputs digital signals of pixels ready to be displayed. At this point the signals are fit for display on a digital monitor. If necessary to fit a particular application, the signals may be converted by a digital to analog converter 210 for display on an analog display.

FIG. 2 illustrates the structure of one embodiment of a variable length encoder 160 and its interaction with a quantizer 140 of FIG. 1. Video information input to the variable length encoder 160 consisted of coded video information such as MBtype, CBPC, CBPY and scaled coefficient information.

The variable length encoder 160 includes several VLC tables in memory, illustrated as 310, 320 and 330 respectively. In practice, a single memory 340 may house all VLC tables. The variable length encoder 160 receives the quantization parameter $Q_p$ from the quantizer 140. Based on the value of the quantization parameter $Q_p$, a processor 350 of the variable length encoder 160 enables one of the VLC tables, say 330 in the illustrated embodiment. The video information addresses the VLC table 330 which, in turn, generates a variable length code representative of the video information.

In a preferred embodiment where all VLC tables are stored in a single memory, both the $Q_p$ signal and the video information are applied as an address for a memory location in which the associated variable length code is stored.

The processor 350 may establish breakpoints between the tables. The processor reports the breakpoints in the breakpoint initialization signal over line 360.

The processor 350 may be replaced by an address logic circuit (not shown) that enables a table based on the magnitude of $Q_p$. The address logic circuit would not permit an adaptive breakpoint in the manner shown above with respect to the processor 350 above.

The present invention provides advantages in variable length coding of video signals by developing unique variable length code tables based upon values taken by a variable quantization parameter. The statistics of video information depends heavily upon the quantization parameter used. The present invention capitalizes on this relationship by using the quantization parameter as a basis for selecting among the memory tables and using the video information to select and entry from the selected table.

We claim:

1. A method of encoding video information according to a plurality of memory tables each storing a plurality of variable length codes wherein breakpoints between the memory tables are based on predetermined values of the quantization parameters, the video information comprising blocks of luminance data and chrominance data, each block associated with a quantization parameter, comprising the steps of:

receiving the blocks; and for each block selecting one of the memory tables based on the quantization parameter associated with the block, and retrieving a variable length code from the memory table based on the block wherein the retrieving step is performed identically regardless of whether the block is luminance data or chrominance data.

2. The method of claim 1, wherein the tables associate shorter variable length codes with video information that is statistically more likely to occur at the quantization parameter values associated with the tables and longer variable length codes with video information that is statistically less likely to occur at the quantization parameter values associated with the tables.

3. The method of claim 1, wherein the quantization parameter is updated for each macro block of video information received.

4. The method of claim 3, further comprising a step of, in response to an update of the quantization parameter, selecting another of the memory tables.

5. The method of claim 1, wherein the retrieving step is performed identically regardless of whether the video information contains inter coded video information or intra coded video information.

6. The method of claim 1, wherein the video information contains video data and overhead information.

7. A method of encoding video information, the video information associated with a quantization parameter, according to a plurality of memory tables each storing a plurality of variable length codes, comprising the steps of:

receiving the video information, selecting one of the memory tables based on the quantization parameter associated with the video information, and retrieving a variable length code from the memory table based on the video information wherein breakpoints between the memory tables are based on predetermined values of the quantization parameter.

8. A method of encoding video information, the video information associated with a quantization parameter, according to a plurality of memory tables each storing a plurality of variable length codes, comprising the steps of:

receiving the video information, selecting one of the memory tables based on the quantization parameter associated with the video information, and retrieving a variable length code from the memory table based on the video information wherein breakpoints between the memory tables may be determined dynamically based on values of the quantization parameter.

9. The method of claim 8, further comprising a step of generating an initialization signal identifying the quantization parameters defining the breakpoints between the memory tables.

10. The method of claim 9, wherein the initialization signal is represented as an offset from a base breakpoint.

11. A variable length encoder, comprising:

a plurality of memory tables, each table containing variable length codes, wherein breakpoints between the memory tables are based on predetermined values of the quantization parameters, a video information input coupled to each memory table for indexing individual entries within each table, a quantization parameter input coupled to each memory table for selecting each table at unique values of the quantization parameter, and an output coupled to each memory table generating a signal representing an entry indexed by a video information signal of a table enabled by a quantization parameter signal wherein the encoder enables the memory tables identically regardless of whether video information input to the encoder is luminance data or chrominance data.

12. The encoder of claim 11, wherein each memory table associates shorter variable length codes with video information that is statistically more likely to occur for the quantization parameter that selects the table.

13. The encoder of claim 11, wherein each memory table associates longer variable length codes with video information that is statistically less likely to occur for the quantization parameter that selects the table.

14. The encoder of claim 11, wherein the encoder enables the memory tables identically regardless of whether video information input to the encoder contains inter coded video information or intra coded information.

15. A variable length encoder, comprising:

a plurality of memory tables, each table containing variable length codes, wherein each memory table is selected by unique values of a quantization parameter, a video information input coupled to each memory table for indexing individual entries within each table, a quantization parameter input coupled to each memory table for selecting each table at unique values of the quantization parameter and an output coupled to the each memory table generating a signal representing an entry indexed by a video information signal of a table enabled by a quantization parameter signal wherein breakpoints define the different ranges of the quantization parameter that select the memory tables and the breakpoints are predetermined.

16. A variable length encoder, comprising:

a plurality of memory tables, each table containing variable length codes, wherein each memory table is selected by unique values of a quantization parameter, a video information input coupled to each memory table for indexing individual entries within each table, a quantization parameter input coupled to each memory table for selecting each table at unique values of the quantization parameter and an output coupled to the each memory table generating a signal representing an entry indexed by a video information signal of a table enabled by a quantization parameter signal wherein breakpoints define the different ranges of the quantization parameter that select the memory tables and the breakpoints are dynamically set.

17. The encoder of claim 16, further comprising a signal generator for generating an initialization signal that identifies the breakpoints.

18. An encoded bit stream generated according to the method of:

receiving video information associated with a quantization parameter, the video information comprising blocks of luminance data and chrominance data, each block associated with a quantization parameter, for at least one block, selecting one of a plurality of memory tables based on the quantization parameter, breakpoints between the memory tables being based on predetermined values of the quantization parameters, retrieving a variable length code from the memory table based on the video information, wherein the retrieving step is performed identically regardless of whether the block is luminance data or chrominance data, and outputting the retrieved code as a bit stream.

19. A variable length encoder, comprising:

a first memory table containing a set of variable length codes associated with video information, the first table associated with a first range of quantization parameter values, a second memory table containing a second set of variable length codes associated with video information, and the second table associated with a second range of quantization parameter values, wherein the first and second ranges are mutually exclusive, an output coupled to each memory table, outputting a variable length code for outputting a variable length code selected by a video information input from a table selected by a quantizer parameter input wherein the encoder enables the memory tables identically regardless of whether video information input to the encoder is luminance data or chrominance data.

20. The encoder of claim 19, wherein each memory table associates shorter variable length codes with video information that is statistically more likely to occur for the quantization parameter that selects the table.

21. The encoder of claim 19, wherein each memory table associates longer variable length codes with video information that is statistically less likely to occur for the quantization parameter that selects the table.

22. The encoder of claim 19, wherein the encoder enables the memory tables identically regardless of whether video information input to the encoder is luminance data or chrominance data.

23. The encoder of claim 19, wherein the encoder enables the memory tables identically regardless of whether video information input to the encoder contains inter coded video information or intra coded information.

24. The encoder of claim 19, wherein breakpoints define the different ranges of the quantization parameter that select the memory tables and the breakpoints are predetermined.

25. The encoder of claim 19, wherein breakpoints define the different ranges of the quantization parameter that select the memory tables and the breakpoints are dynamically set.

26. The encoder of claim 19, further comprising a signal generator for generating an initialization signal that identifies the breakpoints.

* * * * *